US007395167B2

(12) United States Patent
Frolik

(10) Patent No.: US 7,395,167 B2
(45) Date of Patent: Jul. 1, 2008

(54) METHOD OF MAKING A DECISION ON THE STATUS OF A MECHANICAL SYSTEM USING INPUT AND RESPONSE DATA ACQUIRED IN SITU

(75) Inventor: Jeffrey L. Frolik, Essex Junction, VT (US)

(73) Assignee: The University of Vermont and State Agricultural College, Burlington, VT (US)

( * ) Notice: Subject to any disclaimer, the term of this patent is extended or adjusted under 35 U.S.C. 154(b) by 0 days.

(21) Appl. No.: 11/413,025

(22) Filed: Apr. 27, 2006

(65) Prior Publication Data

US 2006/0265144 A1  Nov. 23, 2006

Related U.S. Application Data

(60) Provisional application No. 60/676,244, filed on Apr. 29, 2005.

(51) Int. Cl.
*G06F 19/00* (2006.01)
(52) U.S. Cl. ...................................... 702/113
(58) Field of Classification Search ................. 702/113, 702/33, 103; 73/11.01; 700/275
See application file for complete search history.

(56) References Cited

U.S. PATENT DOCUMENTS

| 5,456,341 | A   | * | 10/1995 | Garnjost et al. ............. 188/378 |
| 5,777,467 | A   |   | 7/1998  | Arms et al. ............. 342/207.18 |
| 6,198,246 | B1  |   | 3/2001  | Yutkowitz ................... 318/561 |
| 6,259,221 | B1  |   | 7/2001  | Yutkowitz ................... 318/561 |
| 6,281,650 | B1  |   | 8/2001  | Yutkowitz ................... 318/561 |
| 6,324,920 | B1  |   | 12/2001 | DeSchrijver ........... 73/862.046 |
| 6,636,817 | B2  |   | 10/2003 | Fioravanti ..................... 702/75 |
| 6,972,678 | B2  |   | 12/2005 | Houston et al. .......... 340/539.1 |
| 7,005,993 | B2  |   | 2/2006  | Webb et al. ................. 340/601 |
| 7,021,140 | B2  |   | 4/2006  | Perkins ........................ 73/493 |
| 7,024,315 | B2  |   | 4/2006  | Giurgiutiu ................... 702/33 |
| 7,027,953 | B2  |   | 4/2006  | Klein .......................... 702/184 |
| 2003/0018400 | A1 | * | 1/2003 | Tuttle et al. ................... 700/29 |

OTHER PUBLICATIONS http://www.m-w.com/dictionary/in%20situ, p. 1.*
*Introduction to Experiment 2: Vibrations;* Aug. 25, 2004 http://www.ecs.syr.edu/faculty/glauser/mae415/vibesLab/goodVibesExp.html.
*Quantification of Human Knee Kinematics Using the 3DM-GXI Sensor;* David Churchill, Ph. D.; Microstrain Inc., Jan. 2004, pp. 1-12.

(Continued)

*Primary Examiner*—Tung S Lau
(74) *Attorney, Agent, or Firm*—Downs Rachlin Martin PLLC

(57) ABSTRACT

An in-situ monitoring system is engaged with a mechanical system for which it is desired to assess or monitor the in-situ performance of the mechanical system. The in-situ monitoring system includes at least one input sensor and at least one output sensor for collecting data corresponding, respectively, to input into, and output from, the mechanical system. The monitoring system also includes an analyzer that utilizes the input and output data to generate an in-situ response representation of the mechanical system. The in-situ representation may be used to make a decision regarding the status of the mechanical system, e.g., to replace all or part of it, to adjust it or to do nothing. In one embodiment, the analyzer is programmed to adapt to the operating conditions of the mechanical system by automatically selecting which one of a number of target representations should be used to characterize the in-situ representation.

28 Claims, 6 Drawing Sheets

OTHER PUBLICATIONS

*Identification of soil degradation during earthquake excitations by Bayesian inference*; Jianye Ching and Steven D. Glaser; *Earthquake Engineering and Structural Dynamics*; 2003; 32: 845-869.

*Experimental Modal Analysis (A Simple Non-Mathematical Presentation)*; Peter Avitabile; *Sound & Vibration Magazine*; May 27, 2000; pp. 1-15.

Tuning Parameters in Engineering Design; Kevin N. Otto and Erik K. Antonsson; Imprecision in Engineering Design; ASME Journal of Mechanical Design, 117(B) (Special Combined Issue of the Transactions of the ASME commemorating the 50th anniversary of the Design Engineering Division of the ASME); 2001; pp. 99-114.

* cited by examiner

METHOD OF MAKING A DECISION ON THE STATUS OF A MECHANICAL SYSTEM USING INPUT AND RESPONSE DATA ACQUIRED IN SITU

RELATED APPLICATION DATA

This application claims the benefit of priority of U.S. Provisional Patent Application Ser. No. 60/676,244, filed Apr. 29, 2005, and titled "System And Method For Analyzing The Response Of A Mechanical System," that is incorporated by reference herein in its entirety.

FIELD OF THE INVENTION

The present invention generally relates to the field of mechanical systems. More particularly, the present invention is directed to a method of making a decision on the status of a mechanical system using input and response data acquired in situ.

BACKGROUND

It is often desirable to tune mechanical systems to the specific operating conditions they are/will be subjected to in order to optimize their performance. Examples of such mechanical systems in which tuning can be beneficial are many, such as vehicle shock absorbers, natural and artificial skeletal joints, connections components within structures or devices, to name just a few. Conventionally, mechanical systems are tuned in a variety of ways.

For example, some structures are tuned during their design and engineering phase using a mathematical process known as structural dynamic modification (SDM). Typically, in an SDM simulation process an initial design is created and subjected to a modal analysis to create a modal model of the structure. This modal model, typically comprising frequency, damping and mode shape data for the structure, is used to determine the effects of changes in system characteristics due to physical changes made to the structure in achieving a response that fall within acceptable limits. This process of changing the mechanical system to suit response criteria may be referred to as "tuning". Once the SDM simulation process shows that the response of the mechanical system is acceptable, the actual system can be built. Relatedly, other simulations, such as force response simulation, can be performed to predict the response(s) of a mechanical system to one or more design forces applied to the system. As with SDM simulation, force response simulations are often used in an iterative manner to change the design of a system, i.e., "tune" the system, until an acceptable response is achieved for the design forces. Likewise, once a desired response is achieved through simulation, the actual system can be built. Depending upon the nature of the mechanical system, once the system has been built from the design, the response of the actual system to an applied, known input force is measured to confirm that the simulations sufficiently predicted the behavior of the actual system. This type of tuning does not involve the monitoring of changes in the response of the system over time.

Whereas the tuning of some mechanical systems is accomplished during the design and engineering phase, in other cases existing mechanical systems are tuned using measured response data. For example, dynamically adjusting suspension dampers (shock absorbers) for automobiles utilize multiple sensors placed in various locations on the automobile to provide feedback information to a microprocessor that dynamically adjusts the damping rates of the dampers in response to the information from the sensors. In this scenario, information regarding the input loads to the suspension system is not collected. Only information relating to the response of the suspension system and, often, information regarding driver input, e.g., steering, throttle and braking information, is utilized in the algorithm for adjusting the damping rates.

In addition to tuning mechanical systems, it is often desirable to monitor the performance, or "health," of mechanical systems over time. This is typically done in the context of large civil structures and expensive aircraft and spacecraft. Similar to conventional tuning of existing mechanical systems, performance monitoring systems typically utilize only measured response data.

SUMMARY

In one aspect, the present invention is directed to a method of making a decision on a status of a mechanical system. The method comprises the step of selecting a mechanical system responsive to at least one operating input load so as to have an operating response to the at least one operating input load. First data representing the at least one operating input load and second data representing the operating response are collected. An in-situ representation of the mechanical system is generated as a function of the first data and the second data. The in-situ representation is assessed so as to make a decision regarding the status of the mechanical system.

In another aspect, the present invention is directed to a method of monitoring performance of a mechanical system. The method comprises selecting a mechanical system responsive to at least one operating input load so as to have an operating response to the at least one operating input load. At a plurality of intervals over an extended period: 1) first data representing the at least one operating input load is collected; 2) second data representing the operating response is collected; and 3) an in-situ diagnostic representation of the mechanical system is generated as a function of the first data and the second data. The in-situ diagnostic representation is assessed so as to monitor the performance of the mechanical system.

In a further aspect, the present invention is directed to a method of assessing the performance of a mechanical system having at least one input and a response to the at least one input. The method comprises storing, via a first signal from a first sensor placed in operative relation to the mechanical system, input data corresponding to the at least one input. Response data corresponding to the response is stored via a second signal from a second sensor placed in operative relation to the mechanical system. An in-situ response representation is automatically generated as a function of the input data and the response data. One of a plurality of stored target-representations is automatically selected as a function of the input data. A comparison of said in-situ response representation to said one of said plurality of stored target-representations is automatically made.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1A:
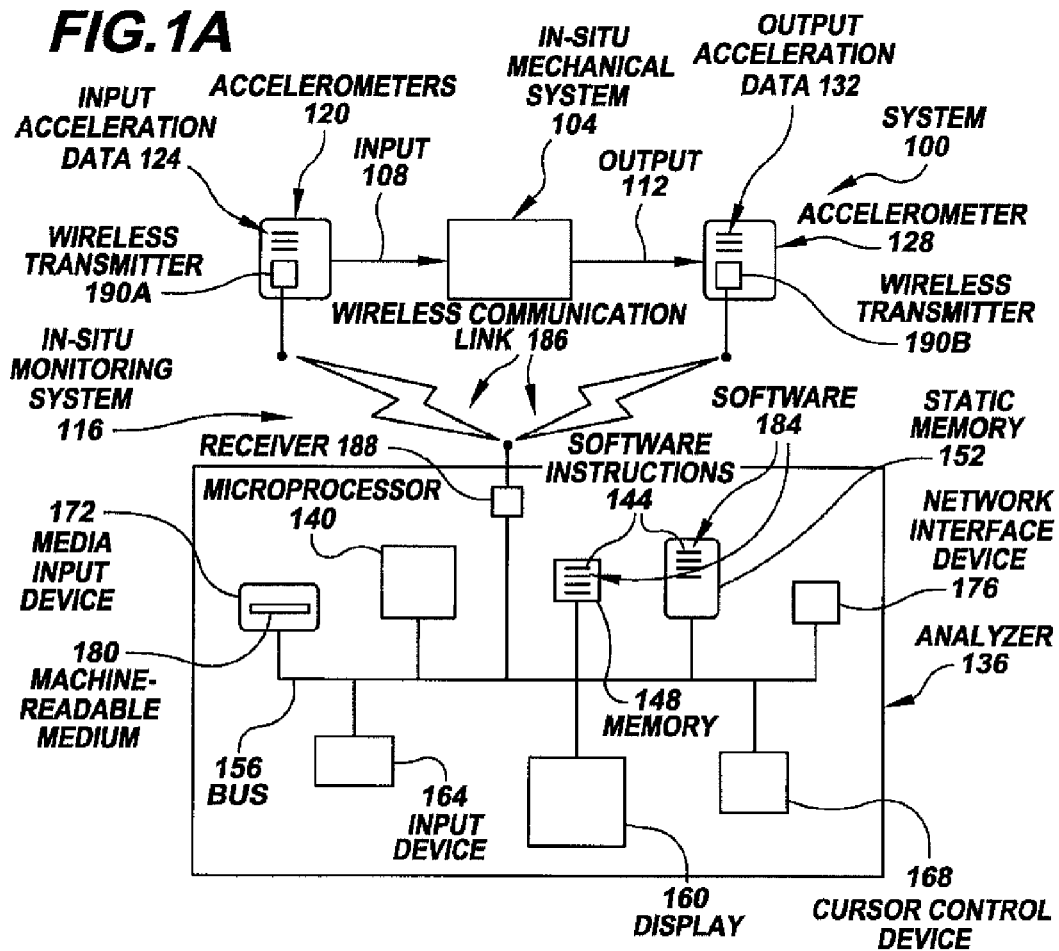
FIG. 1A is a high-level schematic diagram of an in-situ system of the present invention.

Referring now to the drawings, FIG. 1A illustrates in accordance with the present invention a system, which is generally denoted by the numeral 100. System 100 generally includes an in-situ mechanical system 104 having at least one input 108 and at least one output 112 that is a function of the input and the effect of the mechanical system on the input. By "in-situ" it is meant that mechanical system 104 is a real, physical system subjected to actual or simulated operating conditions. As those skilled in the art will readily appreciate, in-situ mechanical system 104 may be virtually any type of mechanical system in which at least one acceleration (force) at output 112 is a function of at least one acceleration (force) at input 108 and the influence of in-situ mechanical system 104 upon the input acceleration(s). For the sake of illustration but not limitation, examples of in-situ mechanical system 104 include a single vehicle damper (shock absorber) or an entire vehicle suspension system, a natural or artificial skeletal joint or other body part, e.g., a limb or individual bone, or a connection, joint or other component of virtually any type of structure, device or apparatus, among other things. Those skilled in the art will readily appreciate the vast array of mechanical systems suitable for use as mechanical system 104 of the present invention, such that an exhaustive list is not required for those skilled in the art to appreciate the broad scope of the present invention.

Typically, in a system such as in-situ mechanical system 104 it is often desirable to determine, or monitor, the response of the system to one or more inputs for a variety of reasons, including tuning the system to particular operating conditions and determining the performance of the system under actual conditions, e.g., to assess whether or not to replace or modify the system or take the system out of service. For example, in the case of an in-situ vehicle suspension containing one or more dampers, it is often desired to know how each damper responds to a particular motional and/or force input or, perhaps, several different types of motional and/or force inputs in order to tune the suspension to those inputs or to assess whether or not that damper needs to be replaced. In the case of an in-situ body part, it is often desired to determine the response of the part to various types of motional and/or force inputs, e.g., impact loads, encountered during a particular condition of use to assess the performance of the body part or to determine whether or not the part needs to be replaced, tuned or adjusted. In the case of structures, e.g., civil structures, it is often desired to determine the response of the entire structure or one or more components of the structure to motional and/or force inputs, such as earthquake loads, wind loads or other live loads, to assess the performance of the structure or component or to determine whether or not the structure or component needs to be replaced or modified. As will be discussed below in greater detail, performance monitoring can be done continuously or periodically over an extended period of time, e.g., day, months or years, and/or in conjunction with a predetermined monitoring routine.

System 100 also includes an in-situ monitoring system 116 that includes one or more sensors, e.g., accelerometers 120, operatively coupled to input 108 so as to acquire input acceleration data 124 relative to input 108, one or more sensors, e.g., accelerometers 128, operatively coupled to output 112 so as to acquire output acceleration data 132 relative to output 112, and an analyzer 136 that receives acceleration data from the accelerometers. It is noted that the term "operatively coupled" is used relative to accelerometers 120, 128 and the respective input 108 or output 112 to indicate that it is not necessary that the accelerometer be attached to the input or output, but rather that the accelerometer provide acceleration data representative of the acceleration of the corresponding input or output. Consequently, each accelerometer 120, 128 could be attached to something other than the input or output, such as a component linked to the input and movable therewith in substantially the same manner. For example, if in-situ mechanical system 104 is a piston/cylinder type shock absorber and the cylinder represents output 112, for practical reasons it may not be possible to attach accelerometer 128 to the cylinder. In this case, it may be necessary to attach a rigid bracket (not shown) to the cylinder and then secure accelerometer 128 to the bracket. In this case, although accelerometer 128 is not attached directly to output 112, it is operatively coupled to the output via the bracket.

Analyzer 136 may be any of a variety of machines capable of executing steps and performing other functions so as to achieve the functionality of the analyzer described in this disclosure. For example, analyzer 136 will typically be a microprocessor-based machine having a microprocessor 140 capable of performing software instructions 144 that provide the analyzer with its desired functionality. However, it is noted that in other embodiments, analyzer 136 may be hardwired so that the functionality is provided by hardware rather than software. In a software-based implementation, such as a laptop computer or handheld computing device implementation, analyzer 136 may include in addition to microprocessor 140 one or more memories, e.g., a main memory 148 and a static memory 152, that communicate with each other via a communications bus 156. Analyzer 136 may further include a display 160, such as a liquid crystal display, organic light emitting diode display or a cathode ray tube, among others. Analyzer 136 may also include an alpha-numeric input device 164 (e.g., a keyboard or keypad), a cursor control device 168

(e.g., a mouse or touchpad), a media input device 172 (e.g., a disk drive, a universal serial bus port or thumb drive, etc.) and a network interface device 176, among other components well-known to those skilled in the art.

Media input device 172 includes a machine-readable medium 180 on which is stored a set of instructions (i.e., software) 184 embodying any one, or all, of the functionalities described in this disclosure. Of course, software 184 may also reside, completely or at least partially, within main memory 148 and/or within microprocessor 140. Software 184 may further be transmitted or received via network interface device 176. For the purposes of this specification, the term "machine-readable medium" shall be taken to include any medium that is capable of storing or encoding a sequence of instructions for execution by the machine and that causes the machine to perform any one of the methodologies of the present invention. The term "machine-readable medium" shall accordingly be taken to include, but not be limited to, solid-state memories (e.g., random access memory, flash memory, etc.), optical and magnetic disks, and carrier wave signals.

Figure 1B:
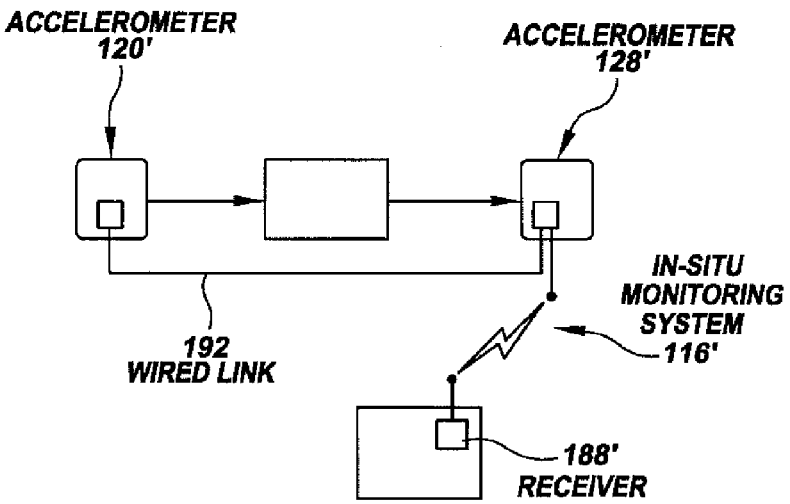
FIG. 1B is a high-level schematic diagram of an alternative in-situ system of the present invention.

In the embodiment shown, communication of input and output acceleration data 124, 132 to analyzer 136 is performed via wireless communication link 186. More particularly, in-situ monitoring system 116 includes a wireless receiver 188 for receiving input and output acceleration data from accelerometers 120, 128. Also in this embodiment, each accelerometer 120, 128 includes a wireless transmitter 190A-B for sending the respective input or output acceleration data 124, 132 and any other information from that accelerometer to receiver 188. In an alternative in-situ monitoring system 116' shown in FIG. 1B, either one of accelerometers 120', 128' may be wireless and the other accelerometer may be non-wireless and communicate its data to the wireless accelerometer via a wired link 192 for communication to a corresponding wireless receiver 188'. In yet other embodiments (not shown), wired link 192 between accelerometers 120', 128' may be replaced by a wireless link, such as a relatively low power radio frequency link.

Referring again to FIG. 1A, as those skilled in the art will readily appreciate, wireless communication link 140 may be any sort of wireless link, such as radio frequency or optical, among others. Of course, in other embodiments, wireless communication link 186 may be replaced by a suitable wired link. In addition, those skilled in the art will readily appreciate that if accelerometers 120, 128 are remotely controllable, receiver 188 and transmitters 190A-B may be replaced with suitable transceivers to facilitate two-way communication.

Each accelerometer 120, 128 and receiver 188 may be commercial off-the-shelf hardware, such as is available from MicroStrain Inc., Williston, Vt. and Crossbow Technology, Inc, San Jose, Calif., among others. Since such hardware is well-known in the art, a detailed description is not necessary to enable those skilled in the art to make and use the present invention.

Analyzer 136 may be operatively configured, via appropriate software, dedicated hardware, or both, as described above, to identify the response of in-situ mechanical system 104 and/or calculate a transfer function for the mechanical system as a function of input and output acceleration data 124, 132. Analyzer 136 may, e.g., utilize multi-dimensional signal processing techniques to determine the response of in-situ mechanical system 104 as an impulse response, frequency domain transfer function, or digital filter coefficients. These and other signal processing techniques may be performed using software 184 developed for the particular mechanical system 104 at issue. If implemented in software 184, the signal processing techniques may be implemented in routines custom programmed or otherwise created using a general purpose signal processing software, such as LabVIEW® graphical programming software available from National Instruments Corporation, Austin, Tex., or MATLAB® computing language and interactive environment software available from The Mathworks, Inc., Natick, Mass. As those skilled in the art will readily appreciate, in-situ mechanical system 104 may be suitably characterized as a linear system, e.g., wherein the input acceleration(s) to the mechanical system are moderate, or as a non-linear system, e.g., wherein the input accelerations are very small or very large. The characterization of mechanical system 104 will generally define what signal-processing techniques are appropriate, i.e., either linear or non-linear techniques.

As described below in greater detail, in-situ monitoring system 116 may enable one to not only determine a current response of mechanical system 104, but may also be used to monitor system responses over time, e.g., in order to identify potential failures and/or maintenance requirements. An advantage of a system of the present invention, such as system 100, is that the performance of a mechanical system, e.g., mechanical system 104, can be monitored in situ under naturally occurring loads from the environment of the mechanical system that may include other components and/or other mechanical systems with which the subject mechanical system interacts. Another advantage of in-situ monitoring system 116 is that, depending upon the type of mechanical system 104 at issue, is that accelerometers 120, 128 may be readily installed and removed for short term testing or, alternatively, may be readily operatively coupled with the subject mechanical system and simply left in place for extended periods, even during normal, unmonitored operation of the mechanical system, if desired.

EXAMPLES

Bicycle Suspension

Figure 2:
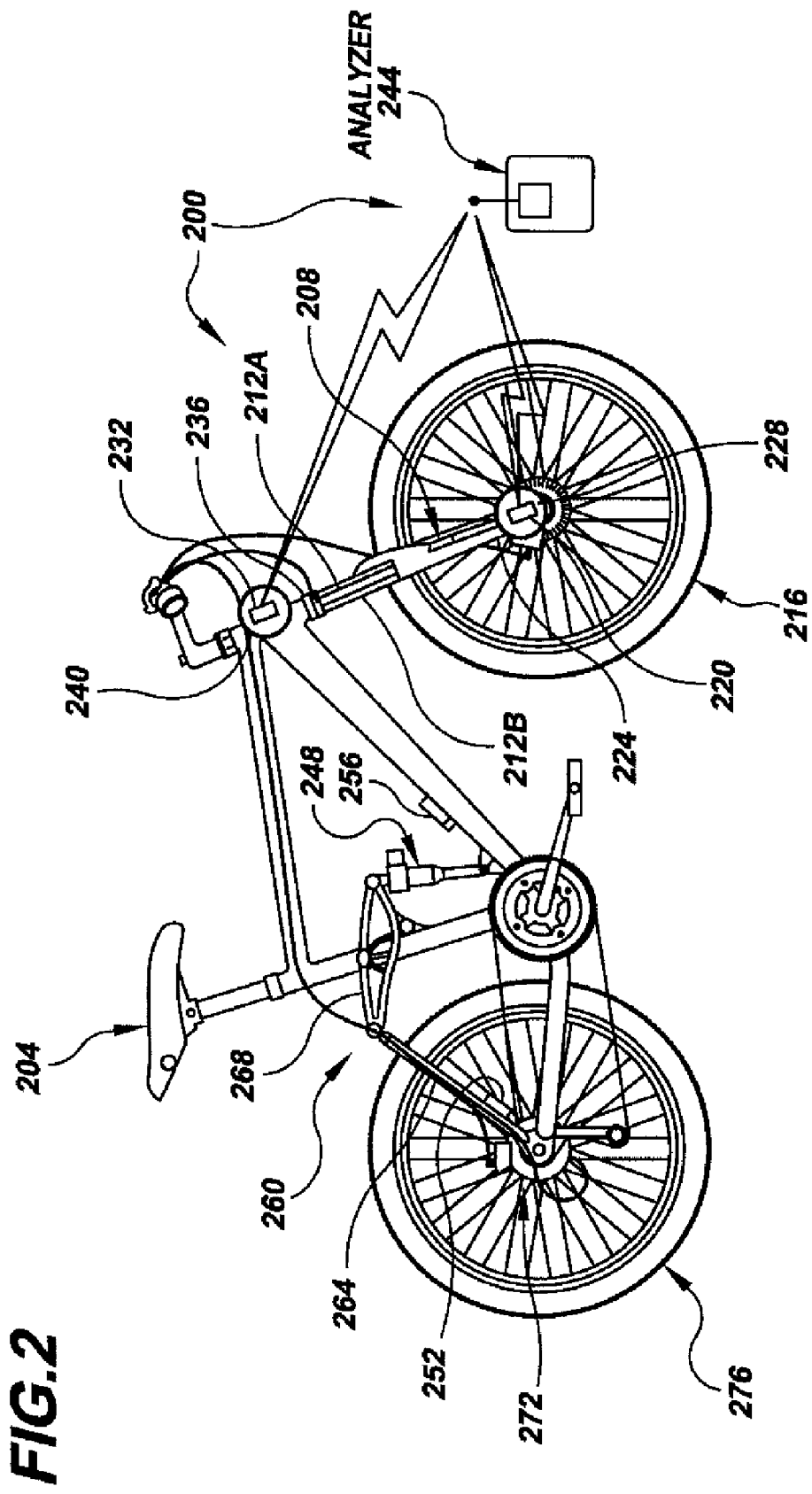
FIG. 2 is a partial elevational view/partial schematic diagram of a bicycle and an in-situ monitoring system of the present invention, wherein the bicycle has a shock-damping front fork and the monitoring system generates a representation of the in-situ response of the front fork to operational loads.

Illustrating a particular example, FIG. 2 illustrates an in-situ monitoring system 200 of the present invention in the context of a mountain bicycle 204 that includes a front suspension, in this case a shock-damping front fork 208. For convenience, in this example the entire shock-damping front fork 208 is considered a shock absorber, even though the fork has two dampers 212A-B, one on each side of the front wheel 216. Consequently, the response of shock-damping front fork 208, i.e., the in-situ mechanical system, will generally be the response of the two dampers 212A-B working together.

A first wireless accelerometer 220, or input accelerometer, may be operatively coupled to an input 224 of shock-absorbing front fork 208, e.g., at location 228, and a second wireless accelerometer 232, or output accelerometer, may be operatively coupled to an output 236 of the front fork, e.g., at location 240. Similar to input and output accelerometers 120, 128 of FIG. 1A, input and output accelerometers 220, 232 of the present example are in communication with an analyzer 244 that may be identical or similar to analyzer 136 of FIG. 1A) that processes and analyzes the data (signals) from the accelerometers in one or more of the manners described above relative to analyzer 136. As those skilled in the art will appreciate, one or more alternative mechanical systems could be defined in connection with shock-absorbing front fork 208. For example, input and output accelerometers 220, 232 may be operatively coupled to each of dampers 212A-B so that the response of each may be determined. Results of such testing could show, e.g., that dampers 212A-B have different responses, which could indicate that one is defective.

In addition, those skilled in the art will readily appreciate that other components or groups of components of bicycle 204 may be designated the mechanical system under consideration and, consequently, analyzed in accordance with the present invention. For example, the performance of a rear-wheel shock damper 248 may be analyzed by attaching accelerometers to the input 252 and output 256 of this shock damper. Alternatively, it may be desired to analyze the performance of the entire rear wheel suspension system 260, including linkages 264, 268 and rear-wheel shock damper 248. In this case, an input accelerometer (not shown) may, e.g., be operatively coupled to linkage 264 near the hub region 272 of the rear wheel 276, and an output accelerometer (not shown) may be operatively coupled to output 256. In this example, the in-situ mechanical system under consideration includes the entire rear wheel suspension system 260.

As mentioned above, in-situ monitoring system 200 can be useful, e.g., in tuning front suspension 208 of bicycle 204 to particular operating conditions. The term "operating conditions" typically encompasses a number of factors, such as weight and preferred riding position of the cyclist (not shown), the riding style of the rider, and the type of terrain on which bicycle 204 will be used. In this example, the cyclist of bicycle 204 desires that front suspension 208 be custom tuned to all these factors so as to achieve the best performance from the front suspension. To perform the tuning, bicycle 204 may be temporarily fitted with first and second accelerometers 220, 232 and tested using in-situ monitoring system 208 while the cyclist desiring the tuning rides the bicycle either over actual terrain or simulated terrain that simulates the actual terrain on which the cyclist anticipates riding the bicycle. In-situ monitoring system 200 acquires measurement data from input and output accelerometers 220, 232 and generates a representation of the response of shock-damping fork 208 as a function of the motional/force input to the fork as measured by the input accelerometer and the response of the fork to this input as measured by the output accelerometer.

Figure 3A:
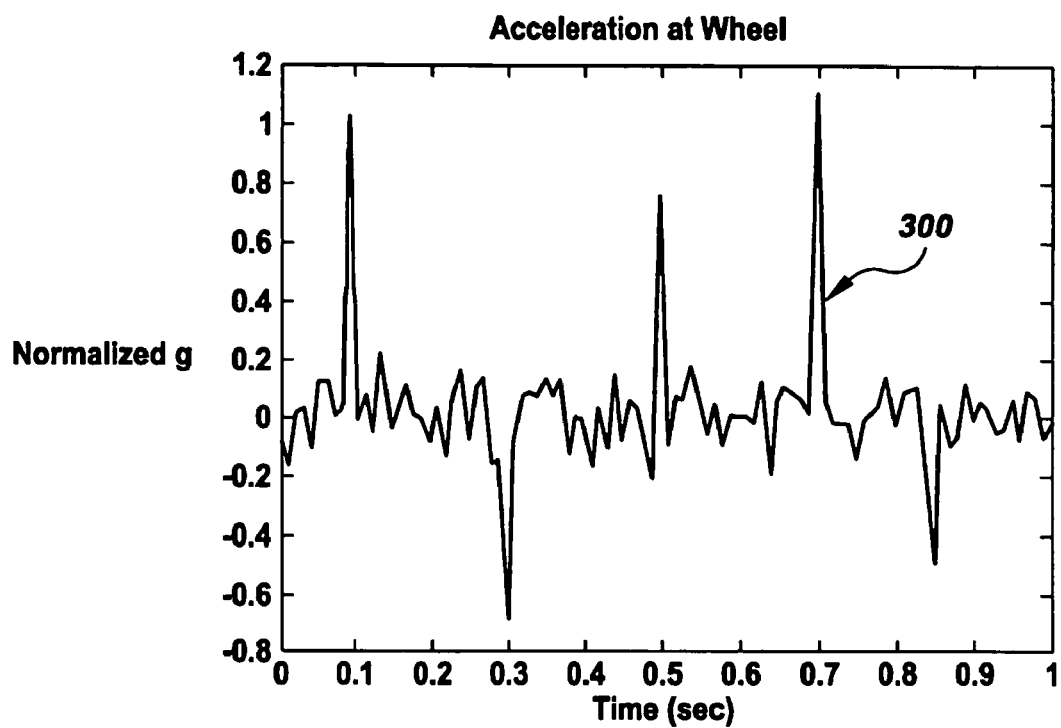
FIG. 3A is a time-domain plot of input acceleration data collected during in-situ monitoring of the shock-damping front fork of FIG. 2.
Figure 3B:
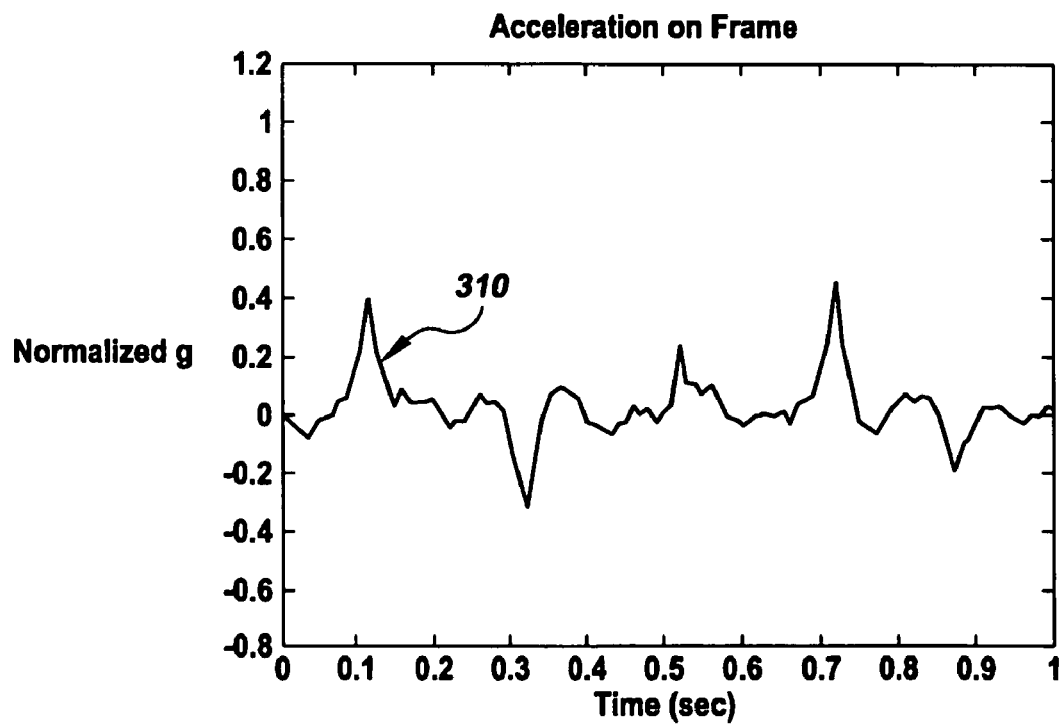
FIG. 3B is a time-domain plot of response acceleration data corresponding to the input acceleration data of FIG. 3A as acquired during the in-situ monitoring and wherein the front fork has an acceptable tuning.
Figure 3C:
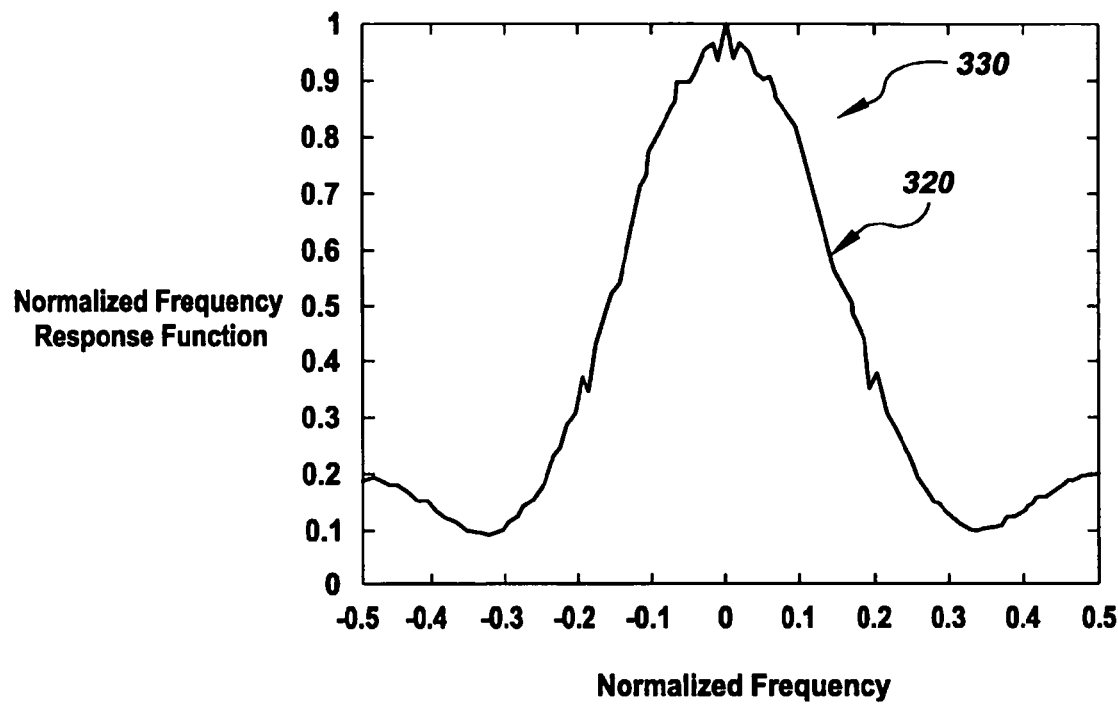
FIG. 3C is a frequency-domain plot of the in-situ frequency response function of the acceptably tuned shock-damping front fork as derived from the input and response acceleration data plotted in FIGS. 3A and 3B, respectively.

Referring to FIGS. 3A-C, and also to FIG. 2, for the sake of illustration FIGS. 3A-C show, respectively: a time-domain plot 300 of input acceleration data acquired by input accelerometer 220 during use of bicycle 204; a time-domain plot 310 of the corresponding response acceleration data acquired by output accelerometer 232 and a frequency-domain plot 320 of the in-situ frequency response function, or spectrum 330, of shock-damping front fork as derived from the input and response acceleration data from the input and output accelerometers, e.g., by obtaining a fast-Fourier transform of the difference between the response and input. As those skilled in the art will appreciate, frequency response spectrum 330 may be considered an in-situ representation of the response of shock-absorbing front fork 208. Again, by "in situ" it is meant that this representation is a representation of the response to loading conditions experienced under operating or simulated operating conditions. As those skilled in the art will readily appreciate, once the input and output acceleration data have been acquired, it is a straightforward matter to represent shock-damping front fork 208 not only visually, as by response spectrum 330, but also mathematically, e.g., by determining its transfer function, or frequency response function, or by determining a series of digital filter coefficients of a suitable digital filter function. As will become clear from the discussion below, frequency response spectrum 330 represents an acceptable tuning of shock-damping front fork 208 for the input loads corresponding to the input acceleration data of plot 300 of FIG. 3A.

Figure 3D:
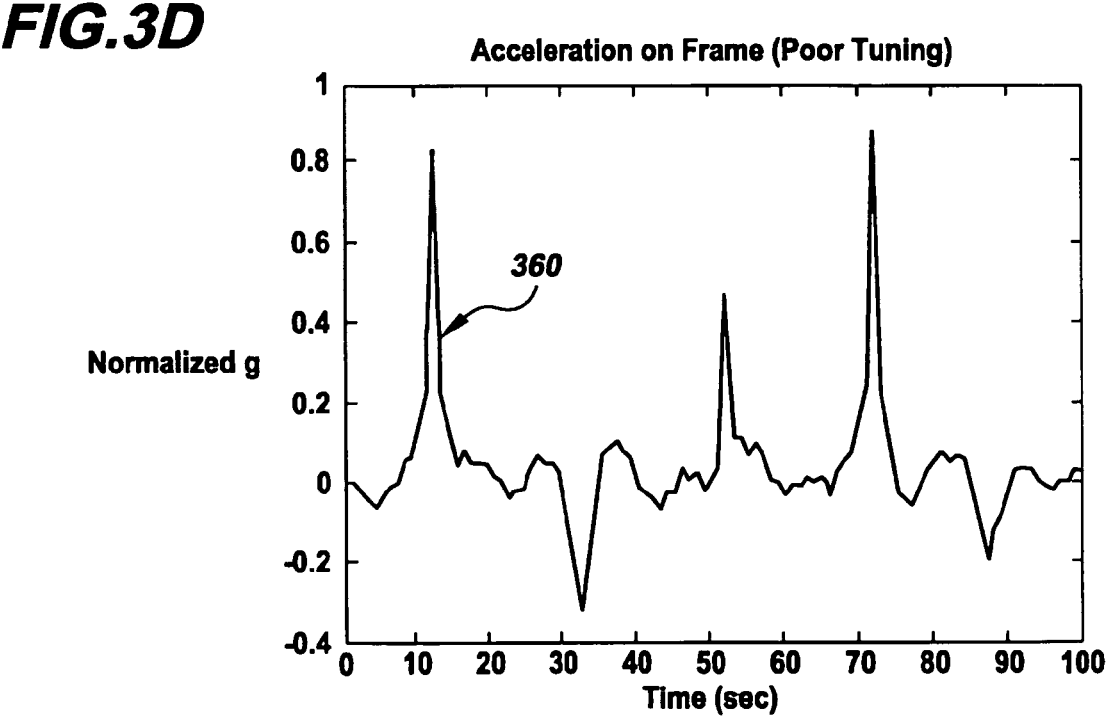
FIG. 3D is a time-domain plot of response acceleration data corresponding to the input acceleration data of FIG. 3A as acquired during the in-situ monitoring and wherein the front fork has an unacceptable tuning.
Figure 3E:
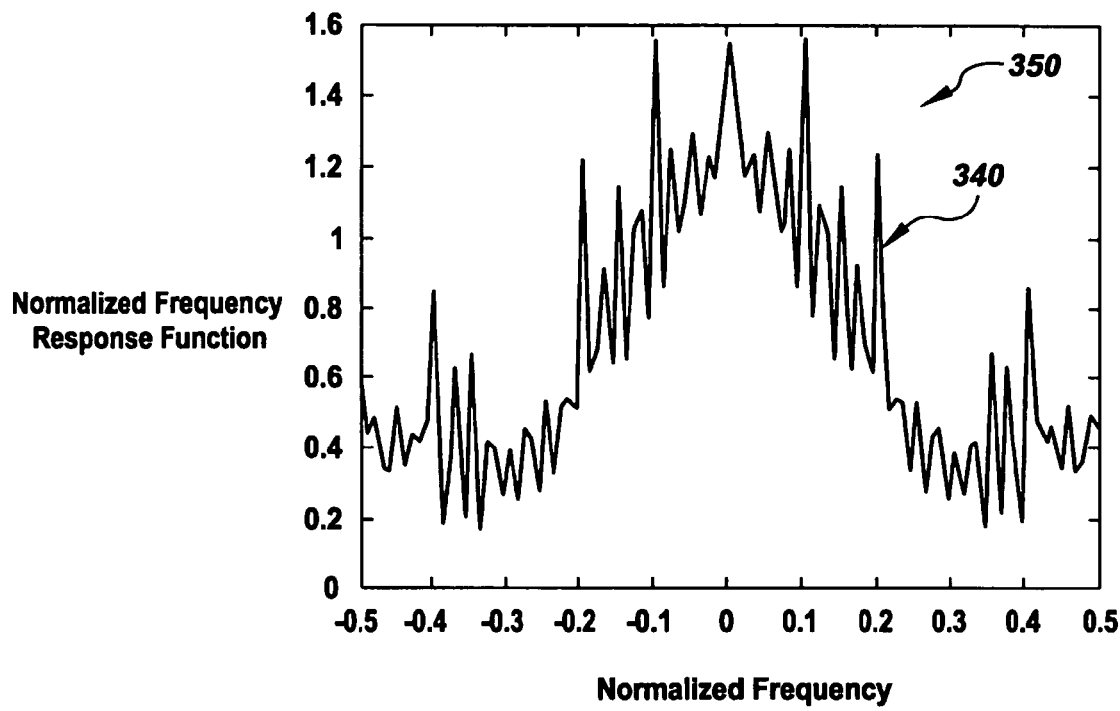
FIG. 3E is a frequency-domain plot of the in-situ frequency response function of the unacceptably tuned shock-damping front fork as derived from the input and response acceleration data plotted in FIGS. 3A and 3D, respectively.

Also for the sake of illustration, whereas frequency response spectrum 330 of FIG. 3C represents the in-situ response of shock-damping front fork 208 when the front fork has an acceptable tuning for the input represented by input acceleration data of plot 300 of FIG. 3A, FIG. 3E shows a frequency-domain plot 340 of a frequency response spectrum 350 of the response of shock-absorbing front fork 208 when the front fork is unacceptably tuned. FIG. 3D, is a time-domain plot 360 of the response acceleration data as obtained from output accelerometer 232 used in conjunction with the input acceleration data of plot 300 of FIG. 3A to produce frequency response spectrum 350 of FIG. 3E. Since both time-domain plots 360, 310 (FIGS. 3D and 3B, respectively) of the responses of shock-damping front fork 208 result from the same input, i.e., the input represented by plot 300 of FIG. 3A, a visual comparison of plots 360, 310 with one another and with the input plot 300 of FIG. 3A provides valuable information about the performance of the front fork. For example, visually time-domain plot 360 of FIG. 3D (unacceptable tuning) to time-domain plot 310 of FIG. 3B (acceptable tuning) shows by virtue of the smaller peaks and valleys of plot 310 that the acceptable tuning provides better damping than the unacceptable tuning represented in FIG. 3D. It is noted that the larger peaks in plot 360 may be due to, e.g., one or both of dampers 212A-B being too stiff or the dampers "bottoming out." While this information is readily obtainable, it is much more useful to compare the response of shock-damping front fork 208 to one or more previously established criteria that allow the performance of the front fork to be more meaningfully characterized. For example, the criteria may be a target frequency response representation, such as a first acceptable-limits envelop 370 shown in FIG. 3F. Acceptable-limits envelop 370 may have been developed empirically or otherwise from prior testing, e.g., by one or more experts in the field. Those skilled in the art will readily appreciate the ways that a target representation, such as first acceptable limits envelope 370, may be obtained.

Figure 3F:
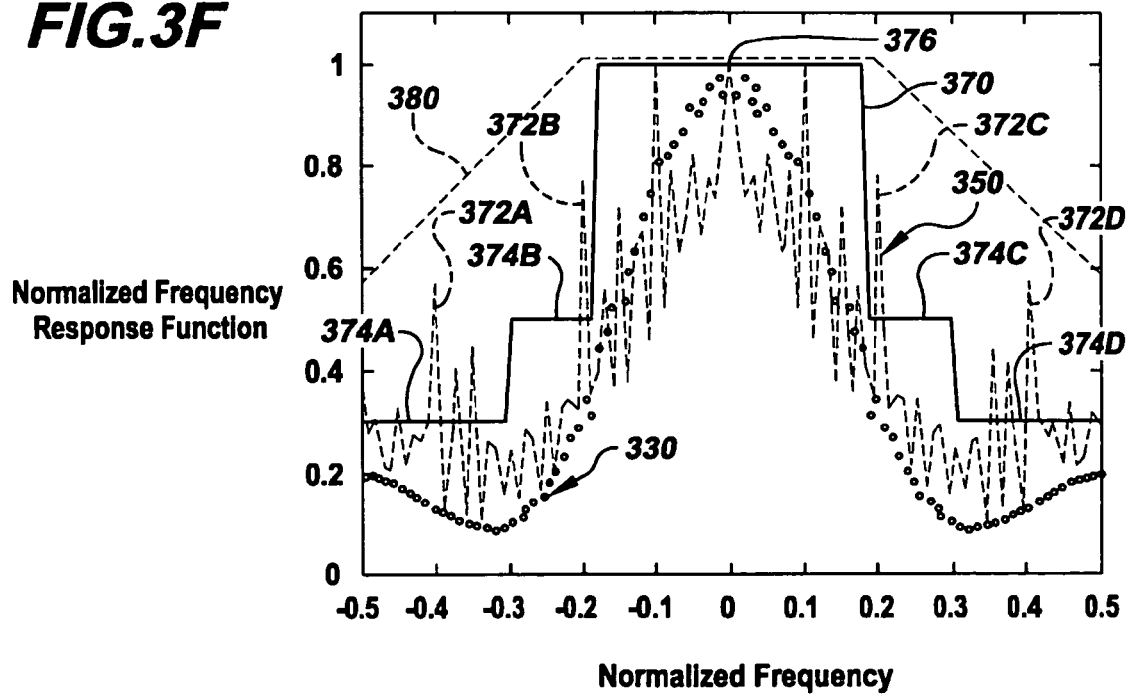
FIG. 3F is a frequency-domain plot showing the in-situ frequency response functions of the acceptably and unacceptably tuned shock-damping front fork of FIGS. 3C and 3F, respectively, plotted against a target-response envelope.

With continuing reference to FIG. 3F, this figure shows both acceptable frequency response spectrum 330 and unacceptable frequency response spectrum 350 plotted along with first acceptable-limits envelop 370. In this example, first acceptable limits envelop 370 simply defines a boundary that the in-situ response representations, in this case and response spectra 330, 350, are to not exceed for the response (tuning) to be deemed acceptable. As can be readily seen from FIG. 3F, unacceptable frequency response spectrum 350 clearly includes a number of local peaks, including peaks 372A-D, that exceed the corresponding respective portions 374A-D of first acceptable limits envelope 370. Consequently, the tuning (response) represented by frequency response spectrum 350 is deemed unacceptable. On the other hand, acceptable frequency response spectrum 330 is clearly seen to be generally well below first acceptable limits envelope 370, except for the central peak 376, which is just on the envelope. Therefore, the tuning (response) represented by frequency response spectrum 330 is deemed acceptable.

While the acceptability of frequency response spectra 330, 350 has been judged visually in this example, those skilled in the art will readily appreciate that acceptability may readily be determined mathematically using various algorithms that analyze the data values represented by frequency response spectra 330, 350 and first acceptable limits envelope 370 and characterize the results of this analysis, e.g., as "Pass"/"Fail", "Acceptable"/"Unacceptable" or "Too stiff"/"Okay"/"Too soft," or the like. This characterization may in and of itself be a decision regarding the status of shock-damping front fork 208 (FIG. 2), e.g., in the case of pass or fail or may result in a decision being made, e.g., a decision to retune the front fork if it is deemed too soft or too stiff. The creation and implementation of algorithms for such analysis and characterization are well within the ordinary skill in the art. It is emphasized that this example is merely illustrative of the many types of analysis and characterization that may be performed. For example, FIG. 3F illustrates only a maximum envelope, i.e., first acceptable limits envelope 370, that is not to be exceeded. In some cases, there may also be a minimum envelope (not shown) that defines a boundary that spectra 330, 350 are not to fall below for a given input. Those skilled in the art will recognize the many variations possible. Of course, the analysis and characterization may be performed by analyzer 244 (FIG. 2)

Alternatively, the tuning criterion(ia) may be simpler than a complete target response spectrum. For example, the tuning criterion may be that the magnitude of the peak acceleration of in-situ acceleration response spectra 330 not exceed a certain value. In this case, the assessment for proper tuning may simply require a quick scan of in-situ spectrum 330 to determine whether the maximum desired acceleration magnitude has been exceeded.

Whatever tuning criterion(ia) is used, if the in-situ representation of the response function does not satisfy it (them), tuning may be accomplished in any of a number of ways. For example, if dampers 212A-B are adjustable-rate dampers, they may be adjusted as needed in attempt to satisfy the criterion(ia). On the other hand, if dampers 212A-B are fixed-rate dampers, they may be swapped out with dampers having damping rates different from just-tested dampers. After dampers 212A-B have been adjusted or different dampers have been installed, bicycle 204 may be in-situ tested again in order to determine if the adjustments or new dampers satisfy the tuning criterion(ia). Of course, this determination may include the same assessment steps discussed above. This process may continue one or more additional times until the tuning criterion(ia) is/are satisfied.

In other embodiments, analyzer 244 may be programmed, e.g., via software similar to software 184 of FIG. 1, to automatically function in several operating regimes corresponding to differing operating conditions of the mechanical system at issue, in this case, shock-damping front fork 208. For example, it may be desirable to tune shock-damping front fork 208 to two (or more) disparate types of input conditions, e.g., on-road conditions and off-road conditions. Consequently, analyzer 244 may be programmed with two different acceptable limits envelopes, i.e., first and second envelopes 370, 380 of FIG. 3F, corresponding respectively to the two different operating conditions.

Analyzer 244 may also be programmed with an algorithm for determining which of first and second acceptable limits envelopes 370, 380 to use for the input conditions. For example, analyzer 244 may be programmed with an algorithm for analyzing the acceleration input data, e.g., the input data represented in plot 300 of FIG. 3A, to determine which of first and second acceptable limits envelope 370, 380 to use in comparing the response representation, e.g., either of frequency response spectra 330, 350. As those skilled in the art will readily appreciate, there are many algorithms that may be implemented for making the determination, such as an algorithm that makes the determination on the average of the acceleration input or the maximum acceleration input measured during a given time period, among others. Once analyzer 244 has determined which of first and acceptable limits envelope 370, 380 to use, the analyzer would then proceed with analyzing the response representation at issue using that envelope. Such an analyzer would be useful, e.g., for tuning shock-damping front fork 208 of a single bicycle so that the tuning of the front fork satisfies the requirements of multiple operating conditions, for adjusting the tuning of a single front fork from one operating scenario to another or for adjusting differing front forks to differing operating conditions. In the last use just mentioned, the differing shock-damping front forks may be on differing bicycles used by the same or differing riders. Any one of these uses could be readily implemented in, e.g., a bike shop, for customizing bicycles to their users. Those skilled in the art will readily appreciate that this general concept of an analyzer, such as analyzer 244, having the ability to adapt to the input conditions of a mechanical system (here, shock-damping front fork 208) can readily be adapted to many other mechanical systems subjected to differing operating conditions.

As those skilled in the art will readily appreciate, although it was mentioned above that accelerometers 220, 232 could be temporarily secured to bicycle 204, in alternative scenarios, the accelerometers may be permanently secured to the bicycle. In this manner, accelerometers 220, 232 can be used to monitor the performance of dampers, e.g., during use in a race or other setting. In addition, while this example is presented in the context of accelerometers 220, 232, virtually any other type of sensors that acquire measurement data of a nature that can be used to generate an in-situ response representation of shock-damping front fork based on input and response data may be used.

Figure 4:
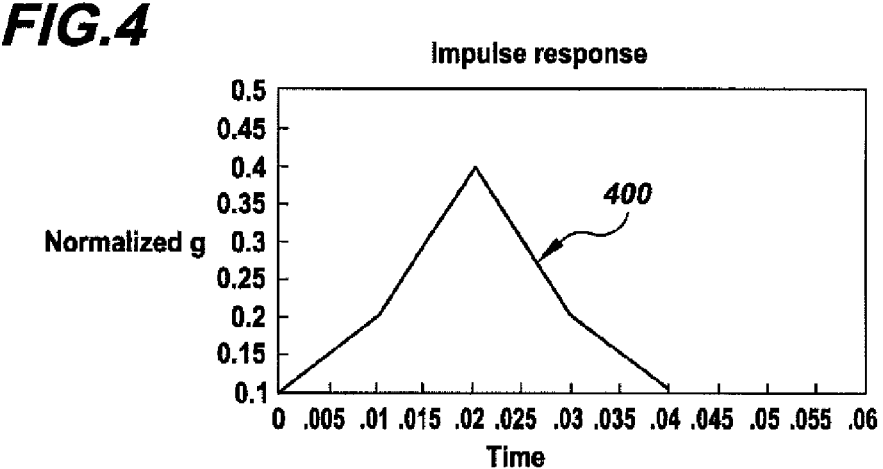
FIG. 4 is a time-domain plot of the response of the shock-damping front fork of FIG. 2 to an impulse input.

Alternatively to subjecting the input side of the mechanical system (i.e., shock-damping front fork 208 (FIG. 2)) to actual or simulated operational input motion/forces as in the previous example, it is noted that in some circumstances it may be desirable to characterize and/or model shock-damping front fork 208 based on an impulse load. In this case, the acceleration input and response of shock-absorbing front fork 208 to this impulse load may be acquired, respectively, by input and output accelerometers 220, 232. Referring to FIG. 4, and also to FIG. 2, FIG. 4 shows an exemplary time-domain plot 400 of an acceleration response of shock-absorbing front fork 208 to an impulse load applied to the input side of the front fork. Modeling the response in the time domain may be advantageous in some applications in that the response allows for the direct determination of the coefficients of a discrete time finite impulse response (FIR) filter. FIR filters are well known in the art and need not be described herein in further detail to enable those skilled in the art to make and use the present invention to its fullest scope as defined by the claims appended hereto.

In addition to its usefulness in working with FIR filters, the acceleration response representation of plot 400 readily provides useful information. For example, it is seen that the peak value of plot 400 occurs at about 0.020 s, which is largely the response delay inherent in shock-absorbing front fork 208 as between locations 228, 240 of input and output accelerometers 220, 232. This delay can be seen, e.g., in FIGS. 3A and 3B by the slight shift of the highest peaks of plot 310 to the right by 0.02 s relative to the corresponding respective highest peaks of plot 300. By virtue of the response representation of plot 400 of FIG. 4 decaying and not rebounding after the decay, plot 400 also shows that there is no ringing in shock-absorbing front fork 208, such that the front fork does not have a problem with resonance.

Artificial Knee

Figure 5:
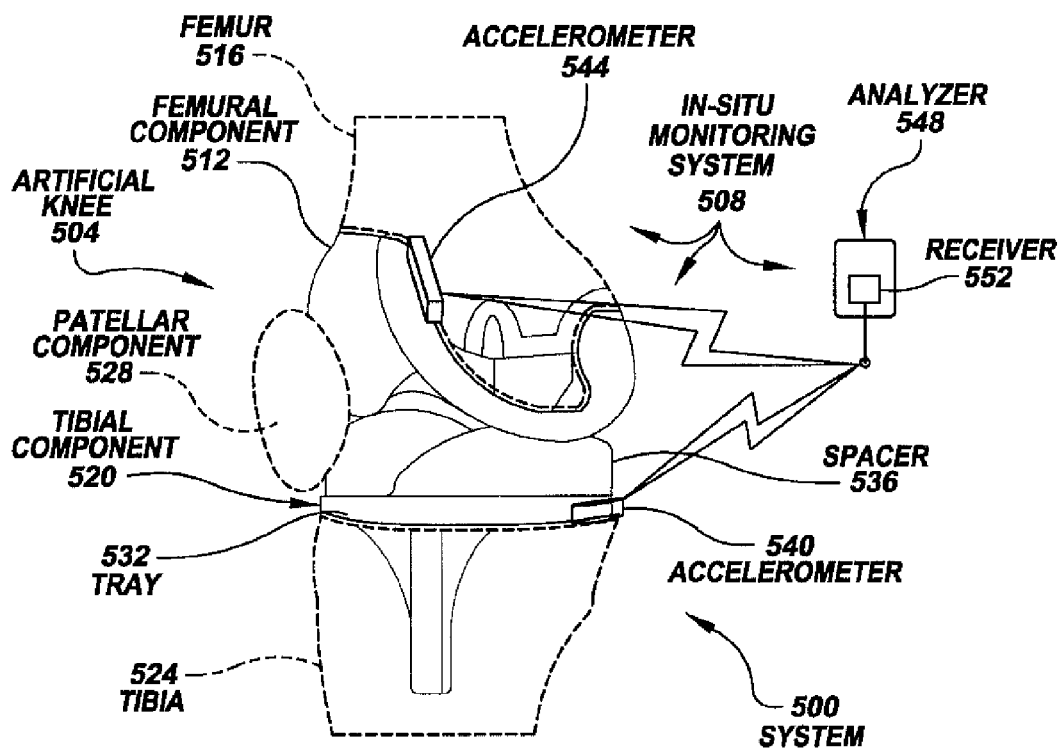
FIG. 5 is a partial elevational view of an artificial knee joint and an in-situ monitoring system of the present invention.

FIG. 5 illustrates a system 500 that includes an artificial knee 504 and an in-situ monitoring system 508 for collecting and generating information regarding the mechanical response of the artificial knee to real-world loads. Such information can be useful in assessing the performance of artificial knee 504 and/or monitoring the "health" of the artificial knee over a period of time. These assessments may be used to make a decision affecting the status of artificial knee 504, e.g., whether or not to replace the knee or any of its components, or making recommendations to the possessor of the knee as to the use of the knee.

Artificial knee 504 may be of either the cemented or uncemented type and includes a femoral component 512 secured to a femur 516, a tibial component 520 secured to a tibia 524 and a patellar component 528. Tibial component 520 may include a tray 532 secured directly to tibia 524 and a spacer 536 that is secured to the tray and provides a resilient cushion and bearing surface for faying with femoral component 512. Femoral component 512 and tray 532 are typically made of metal, such as titanium, cobalt chrome or an alloy of these, while spacer 536 is typically made of a durable, slick plastic, such as nylon. These components of artificial knee 504 are well known in orthopedics.

In-situ monitoring system 508 may include an input sensor, e.g., an accelerometer 540, secured to tray 532 for measuring the input to artificial knee 504 and an output sensor, e.g., an accelerometer 544, secured to femoral component 512. As will be appreciated, in this scenario the locations of input and output accelerometers 540, 544 is based primarily on the desire to assess and monitor the performance of spacer 536, which in this type of artificial knee is the component that provides substantially all of the shock absorbency to artificial knee 504 and is the component that is most likely to wear during use and thereby degrade the performance of the knee. In other scenarios and joint types, it may be desirable to locate input and output accelerometers 540, 544 elsewhere. For example, in the context of artificial knee 504, if it were desired to assess or monitor the performance of the connection of tibial component 520 to tibia 524, input accelerometer 540 may stay attached to tray 532 and output accelerometer 544 secured to the tibia. Alternatively, in this scenario, input and output accelerometers 540, 544 could be swapped with one another so that the input accelerometer 540 is secured to tibia 524 and output accelerometer 544 is secured to tray 532. Similar approaches can be used, e.g., to assess the connection of femoral component 512 and femur 516, except that one of the accelerometers 540, 544 would be secured to the femoral component and the other would be secured to the femur.

Each accelerometer 540, 544 may be any accelerometer suitable for use in a living body. Typically, accelerometers 540, 544 would be wireless accelerometers to avoid the need to have any electrodes (not shown) exposed to the outside for making the necessary wired connections. Each accelerometer 540, 544 may include a piezoelectric strain element (not shown) that generates the power needed by the accelerometers during testing. In other embodiments wherein it is desired to not provide artificial knee 504 with permanent accelerometers 540, 544, other input and output accelerometers may be secured to corresponding respective holders (not show) that are attached, e.g., strapped, independently to the leg below the knee joint and the leg above the knee joint. While the testing using this external set up will include much more noise due to the effects of the soft tissue, e.g., skin and muscle tissue, present between the holder and artificial knee 504, it may be possible to filter this noise from the portion of the signal due to the functioning of the artificial knee. In-situ monitoring system 508 also includes an analyzer 548 and one or more wireless receivers 552 as needed, each of which may be the same as or similar to wireless receiver 144 and analyzer 136 described above in connection with FIG. 1A.

As those skilled in the art will readily appreciate, in-situ monitoring system 508 may be used, e.g., to monitor the performance of artificial knee 504 over a period of time, such as a number of years. For example, a health care provider may set up a long-term monitoring program for monitoring the performance of artificial knee 504 periodically over a number of years so as to track the "health" of the knee over the years. In one scenario, the recipient of artificial knee 504 may be asked to have the knee checked once a year for the first seven years and then every six months thereafter. In this context, the check-up may include having the recipient engage in various activities, such as walking and jogging on a treadmill, during which acceleration data from input and output accelerometers 540, 544 is acquired by analyzer 548. After analyzer 548 has acquired the desired acceleration data, the analyzer may generate an in-situ acceleration response representation using the input and output acceleration data, e.g., in any one of the manners described above.

Depending on the monitoring scheme implemented, in-situ response representation may be used in any one or more of a variety of ways. For example, the in-situ response representation may be compared to one or more desired, or target, response representation for the activities performed by the recipient. The target representation may, e.g., represent a minimum acceptable level of response, such that when the in-situ response representation does not meet the target representation, the performance of artificial knee 504 is deemed unacceptable. If this is the case, a likely decision would be to replace artificial knee 504, or at least spacer 536 if it is independently replaceable and tray 532 is still adequately secured to tibia 524. In another scenario, the first time acceleration data is collected from input and output accelerometers 540, 544 and an in-situ response representation generated, this representation may become a baseline representation against which all subsequent in-situ representations are compared. In this scenario, it is assumed that the first set of acceleration data is collected when artificial knee 504 is essentially new and at its peak performance. Consequently, any subsequent data will represent a performance level below the peak. In this case, a decision to replace knee joint 504 or spacer 536 may be made once the performance of the knee has fallen at least a set amount below the baseline representation. Those skilled in the art will understand how to establish criteria for accepting and rejecting the performance of artificial knee 504 based on experience and/or empirical information.

It is noted that the input and output acceleration data collected and the in-situ response representations generated therefrom may be plotted in the same manner as the corresponding information collected and generated in the bicycle example above as plotted in plots 310, 320, 330 of FIGS. 3A-C, respectively. Likewise, a target or baseline response representation may be plotted for visual usage in the same manner as target acceleration response spectrum 340 of FIG. 3D.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of making a decision on a status of a biomechanical system, comprising:
   selecting a biomechanical system responsive to at least one operating input load so as to have an operating response to said at least one operating input load;
   collecting input load data representing said at least one operating input load;

collecting operating response data representing said operating response;

generating an in-situ representation of said operating response of said biomechanical system as a function of said input load data and said operating response data; and assessing said in-situ representation so as to make a decision regarding the status of said biomechanical system;

wherein the method is performed in a manner that does not control said operating response of said biomechanical system.

2. A method according to claim 1, further comprising a step of obtaining a target-response representation of said biomechanical system, said step of assessing said in-situ representation comprising comparing said in-situ representation and said target-response representation with one another so as to determine a difference between said in-situ representation and said target-response representation.

3. A method according to claim 1, wherein said step of collecting said input load data includes collecting said input load data using a first accelerometer and said step of collecting said operating response data includes collecting said operating response data using a second accelerometer.

4. A method according to claim 1, wherein said step of selecting a biomechanical system comprises a step of selecting an artificial biomechanical system.

5. A method according to claim 1, wherein said decision is to tune said biomechanical system and the method further comprises a step of tuning said biomechanical system.

6. A method according to claim 1, wherein said decision is to replace said biomechanical system and the method further comprises a step of replacing said biomechanical system.

7. A method according to claim 1, wherein said step of generating said in-situ representation comprises a step utilizing multidimensional signal processing techniques.

8. A method according to claim 1, wherein said step of generating said in-situ representation comprises a step generating at least one of the following: an impulse response, a frequency-domain transfer function, frequency response function and digital filter coefficients.

9. A method of monitoring performance of a biomechamical system, comprising:
   selecting a biomechanical system responsive to at least one operating input load so as to have an operating response to said at least one operating input load;
   at a plurality of intervals over an extended period:
     collecting input load data representing said at least one operating input load;
     collecting output response data representing said operating response; and
     generating an in-situ diagnostic representation of said operating response of said biomechanical system as a function of said input load data and said output response data; and
   assessing said in-situ diagnostic representation so as to monitor the performance of said biomechanical system;
   wherein the method is performed in a manner that does not control said operating response of said biomechanical system.

10. A method according to claim 9, further comprising a step of obtaining a baseline-response representation of said biomechanical system, said step of assessing said in-situ diagnostic representation comprising comparing said in-situ diagnostic representation and said baseline-response representation with one another so as to determine a difference between said in-situ diagnostic representation and said baseline-response representation.

11. A method according to claim 9, wherein said step of collecting said input load data includes collecting said input load data using a first accelerometer and said step of collecting said operating response data includes collecting said operating response data using a second accelerometer.

12. A method according to claim 9, wherein said step of selecting a biomechanical system comprises a step of selecting an artificial biomechanical system.

13. A method according to claim 9, wherein at each of said plurality of intervals, temporarily placing a plurality of sensors in operative relationship with said biomechanical system for collecting said input load data and collecting said operating response data.

14. A method according to claim 9, wherein said step of generating said in-situ diagnostic representation comprises a step utilizing multidimensional signal processing techniques.

15. A method according to claim 9, wherein said step of generating said in-situ diagnostic representation comprises a step generating at least one of the following: an impulse response, a frequency-domain transfer function, frequency response function and digital filter coefficients.

16. A method of making a decision on a status of a bicycle suspension, comprising:
   selecting a bicycle suspension responsive to at least one operating input load so as to have an operating response to said at least one operating input load;
   collecting input load data representing said at least one operating input load;
   collecting operating response data representing said operating response;
   generating an in-situ representation of said operating response of said bicycle suspension as a function of said input load data and said operating response data; and
   assessing said in-situ representation so as to make a decision regarding the status of said bicycle suspension;
   wherein the method is performed in a manner that does not control said operating response of said bicycle suspension.

17. A method according to claim 16, further comprising a step of obtaining a target-response representation of said bicycle suspension, said step of assessing said in-situ representation comprising comparing said in-situ representation and said target-response representation with one another so as to determine a difference between said in-situ representation and said target-response representatton.

18. A method according to claim 16, wherein said step of collecting said input load data includes collecting said input load data using a first accelerometer and said step of collecting said operating response data includes collecting said operating response data using a second accelerometer.

19. A method according to claim 16, wherein said decision is to tune said bicycle suspension and the method further comprises a step of tuning said bicycle suspension.

20. A method according to claim 16, wherein said decision is to replace said bicycle suspension and the method further comprises a step of replacing said bicycle suspension.

21. A method according to claim 16, wherein said step of generating said in-situ representation comprises a step utilizing multidimensional signal processing techniques.

22. A method according to claim 16, wherein said step of generating said in-situ representation comprises a step generating at least one of the following: an impulse response, a frequency-domain transfer function, frequency response function and digital filter coefficients.

23. A method of monitoring performance of a bicycle suspension, comprising:
  selecting a bicycle suspension responsive to at least one operating input load so as to have an operating response to said at least one operating input load;
  at a plurality of intervals over an extended period:
    collecting input load data representing said at least one operating input load;
    collecting output response data representing said operating response; and
    generating an in-situ diagnostic representation of said operating response of said bicycle suspension as a function of said input load data and said output response data; and
  assessing said in-situ diagnostic representation so as to monitor the performance of said bicycle suspension;
  wherein the method is performed in a manner that does not control said operating response of said bicycle suspension.

24. A method according to claim 23, further comprising a step of obtaining a baseline-response representation of said bicycle suspension, said step of assessing said in-situ diagnostic representation comprising comparing said in-situ diagnostic representation and said baseline-response representation with one another so as to determine a difference between said in-situ diagnostic representation and said baseline-response representation.

25. A method according to claim 23, wherein said step of collecting said input load data includes collecting said input load data using a first accelerometer and said step of collecting said operating response data includes collecting said operating response data using a second accelerometer.

26. A method according to claim 23, wherein at each of said plurality of intervals, temporarily placing a plurality of sensors in operative relationship with said bicycle suspension for collecting said input load data and collecting said operating response data.

27. A method according to claim 23, wherein said step of generating said in-situ diagnostic representation comprises a step utilizing multidimensional signal processing techniques.

28. A method according to claim 23, wherein said step of generating said in-situ diagnostic representation comprises a step generating at least one of the following: an impulse response, a frequency-domain transfer function, frequency response function and digital filter coefficients.

* * * * *